Aug. 30, 1932.     R. E. LASLEY     1,874,314
POWER PLANT
Filed Dec. 8, 1926     5 Sheets-Sheet 3
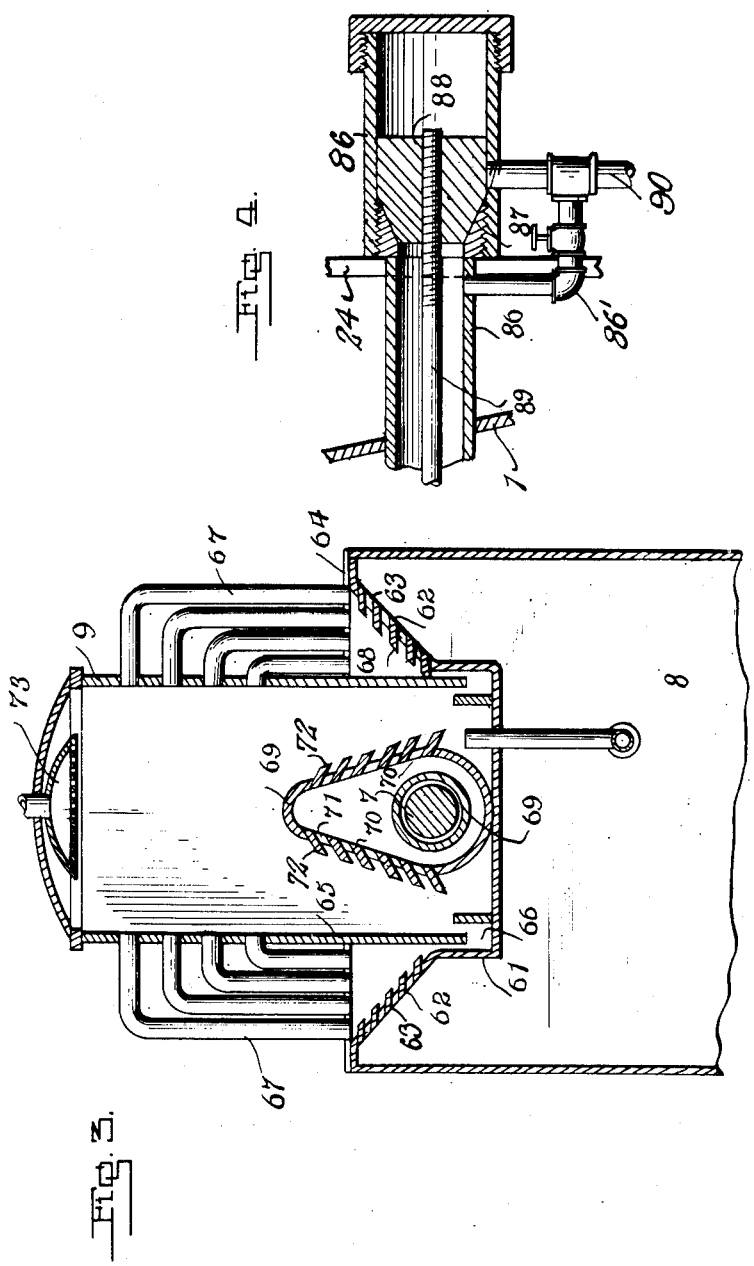
Inventor
R.E.Lasley
By Lacey & Lacey, Attorneys Aug. 30, 1932.  R. E. LASLEY  1,874,314
POWER PLANT
Filed Dec. 8, 1926   5 Sheets-Sheet 4
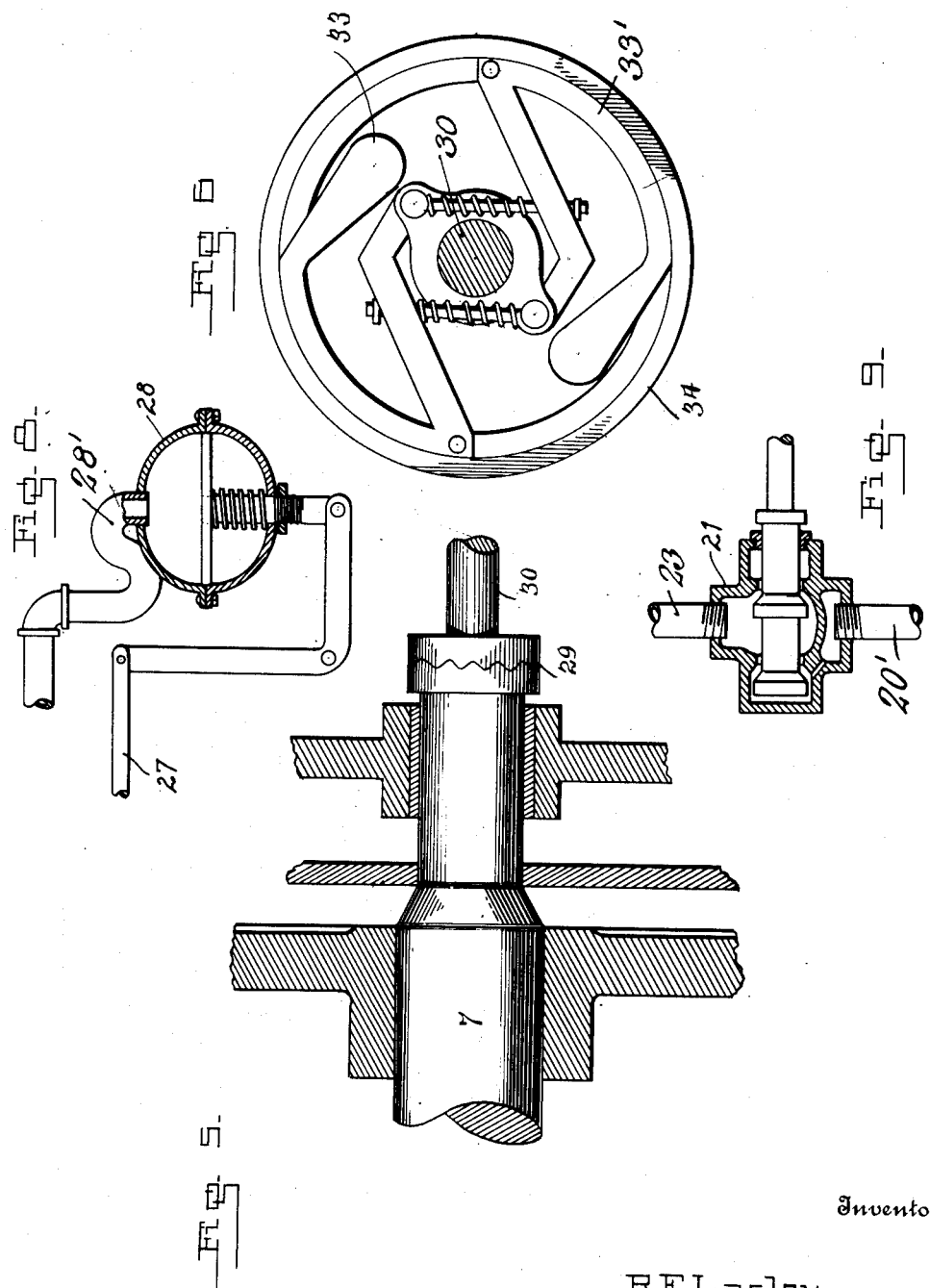

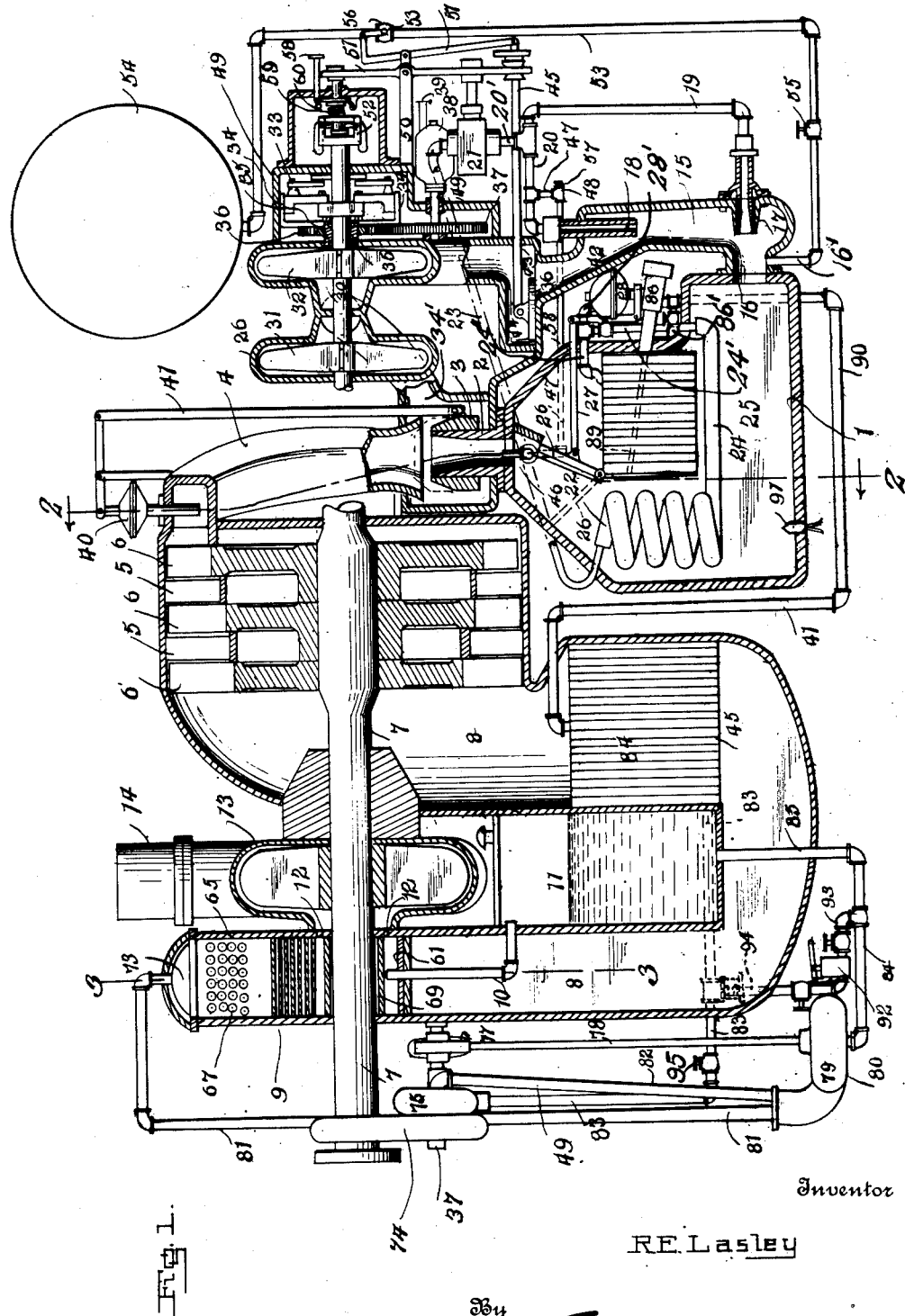

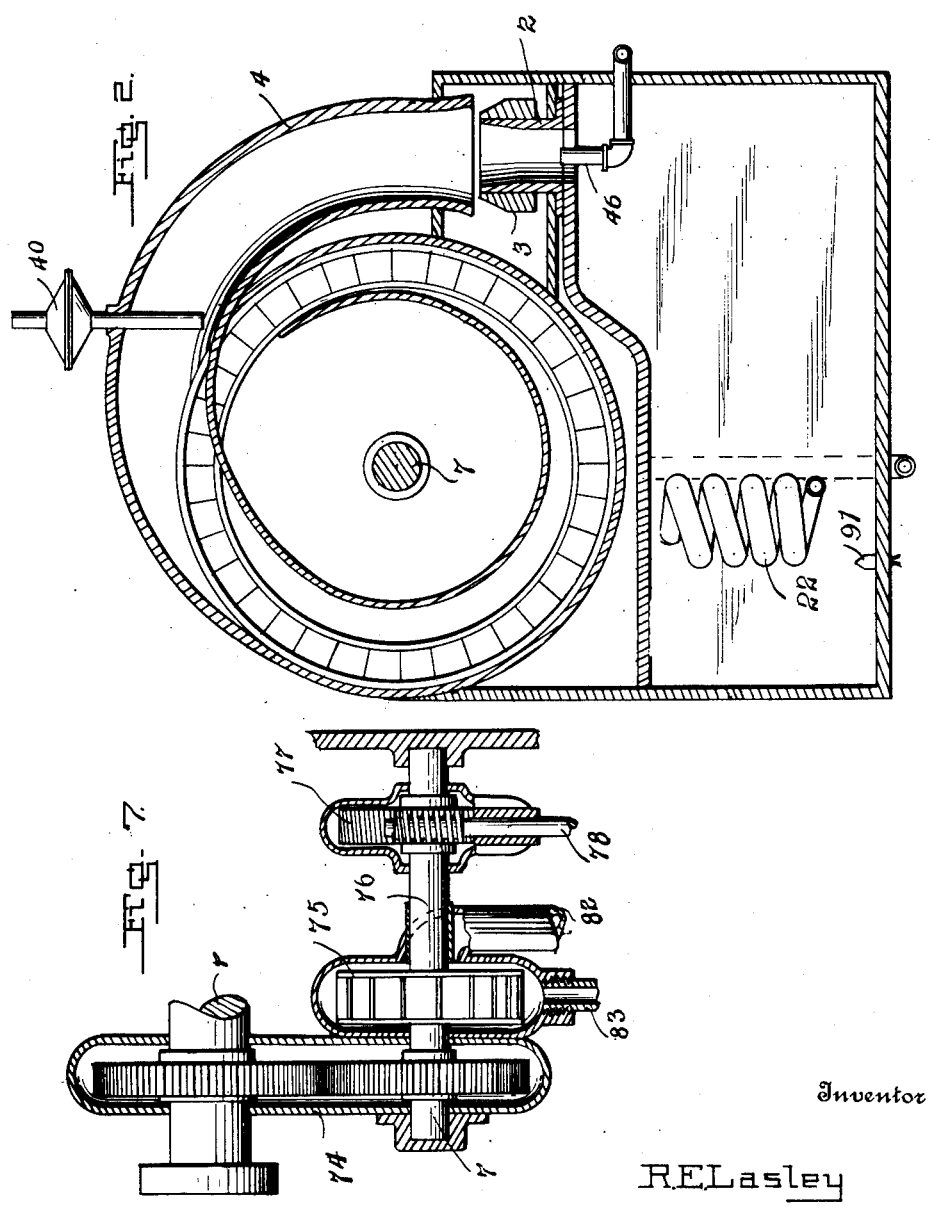

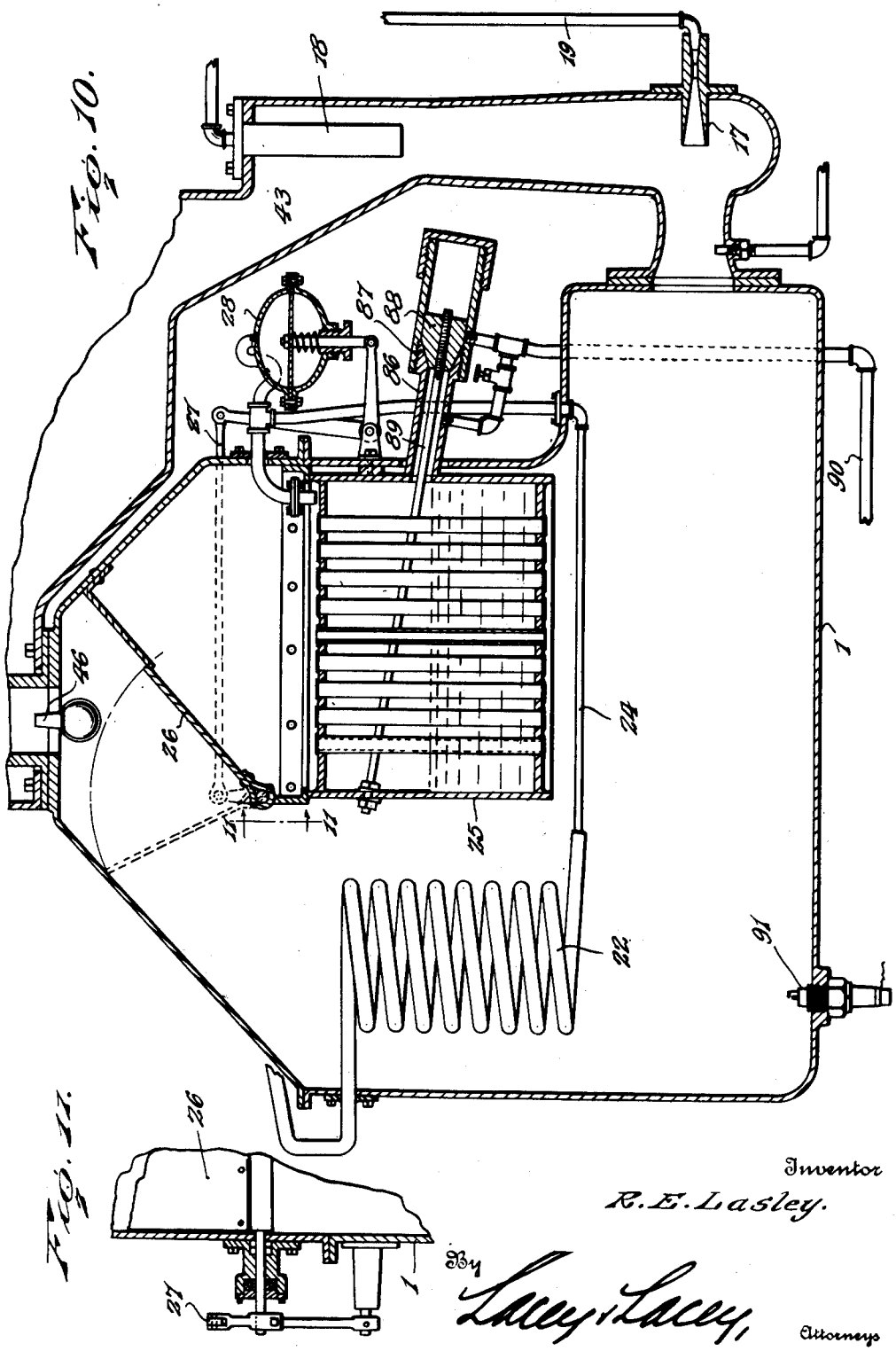

Patented Aug. 30, 1932

1,874,314

UNITED STATES PATENT OFFICE

ROBERT E. LASLEY, OF LIBERTYVILLE, ILLINOIS

POWER PLANT

Application filed December 8, 1926. Serial No. 153,409.

The present invention is directed to improvements in power plants, and is an improvement of my co-pending application, Serial No. 10,368, filed February 19, 1925 which matured into Patent 1,777,097 granted Sept. 30, 1930.

The invention has for one of its objects to provide a power plant so constructed that the same can be started by air induced by a compressor, and further to mix compressed air with the products of combustion to be utilized for driving the motor or turbine.

Another object of the invention is to provide means for condensing the exhaust gases in order that the water of condensation can be used to replenish the plant.

Another object of the invention is to provide means whereby the burning fuel will be directed initially upon the steam generator to generate steam therein in a comparatively short time.

Another object of the invention is to provide means whereby the products of combustion in the combustion chamber can be forcibly drawn therefrom in order that the incoming combustible mixture will enter the combustion chamber with increased velocity.

Another object of the invention is to provide a power plant which is compactly arranged and will be highly efficient in operation, and one which can be used successfully for propelling aeroplanes or motor vehicles.

In the accompanying drawings:

Figure 1 is a longitudinal sectional view, somewhat diagrammatic.

Figure 2 is a transverse sectional view through the manifold and its associated parts taken on the line 2—2 of Figure 1.

Figure 3 is a transverse sectional view through the condenser taken on the line 3—3 of Figure 1.

Figure 4 is a detail sectional view through the generator controlling valve.

Figure 5 is a detail sectional view of the connector between the main drive shaft and compressor driving shaft.

Figure 6 is a detail view of the clutch construction.

Figure 7 is a detail sectional view through the pump driving connection.

Fig. 8 is a detail elevation partly in section showing the pressure regulator.

Fig. 9 is a detail view partly in section showing the governor valve.

Fig. 10 is a sectional view showing in detail the structure of the boiler with its contiguous connections.

Fig. 11 is a detail sectional view taken on the line 11—11 of Fig. 10.

Referring to the drawings, 1 designates the combustion chamber having a nozzle 2 fixed to its upper end and affording communication with the interior thereof. Slidably mounted on the nozzle 2 is a sleeve valve 3, the purpose of which will be later explained.

The discharge end of the nozzle 2 is alined with the lower end of the manifold, or inlet 4, as clearly shown in Figure 1 of the drawings, the motive fluid from the manifold being directed against the fixed and movable blades 5 and 6, respectively, of the turbine 6', the movable blades being fixed to the main drive shaft 7.

It will be observed that the exhaust fluid from the turbine enters the passage of the exhaust chamber 8, which in this instance is of U-shaped formation, and after passing therethrough enters the condenser 9, the water of condensation being conducted therefrom through the pipe 10 to the reservoir 11, while the gases are drawn through openings 12 formed in the condenser by the exhaust blower 13. The exhaust gases are then discharged through the stack 14.

A jet manifold 15 is located adjacent the combustion chamber 1 and has communication therewith through the compression throat 16, there being a steam injecting nozzle 17 alined with said throat and disposed in angular relation with respect thereto is a second steam injecting nozzle 18 entering said chamber, steam to the respective nozzles being furnished through pipes 19 and 20. A fuel discharge nozzle 16' extends into the throat 16. The supply of steam to said pipes is regulated by the conventional form governor valve indicated generally by the numeral 21 and connected to the pipe 20 by a pipe 20'. The steam before entering the governor valve 21 is superheated in the coil 22 and is lead to said valve through the pipe 23. The steam generator 25, as well as the coil 22, is mounted directly in the combustion chamber to be effected by the heat therein, there being pipes 24, 24' and 24" leading from the generator 25 to said coil. The steam generator is in the nature of a fire tube boiler, in order that the flame in the combustion chamber will effectively and quickly heat the water therein.

The combustion chamber 1 has mounted therein a valve or damper 26 pivotally mounted, preferably upon the generator 25, said valve, when in the position shown in dotted lines, serving to direct products of combustion through the generator in order that steam will be more quickly generated, thus permitting the apparatus to start quickly. Obviously the burning mixture will be trapped by the damper 26 and directed in blast form through the generator, thus more quickly heating the same. When the steam reaches a predetermined pressure the valve 26 will be opened to the position as shown in full lines in order that the blast through the generator will be reduced, thus permitting the burning fluid to be directed with more intensity upon the superheater 22. This is accomplished through the medium of the link 27 connected with a common form of pressure regulator 28, which may be of any well known type and is subjected to the steam pressure of the generator through a pipe 28' connected to the pipe 24". It will be of course understood that after the device is properly operating the valve will be closed to permit the motive fluid to pass directly into the nozzle 2.

Fixed to the shaft 7 by a flexible connection 29 is a shaft 30, having fixed thereto a centrifugal compressor 31, there being also loosely mounted on said shaft a compressor 32, said compressors being of the blower type. A clutch structure 33 is associated with the compressor 32 and is operable to cause the compressor to operate with the shaft at the proper time. The clutch structure 33 having its hub fixed to the shaft 30 and is of the well known centrifugal type, the arms 33' thereof cooperating with the drum 34 fixed to the sleeve 35 of the compressor 32 to interlock the compressor with the shaft 30 at a certain speed, said sleeve having a gear 36 fixed thereto which meshes with the gear 37, which is fixed to the shaft of the starting motor 38, there being a suitable switch 39 for stopping or starting the same. Cold air under pressure from the compressor 31 is conducted to the nozzle 2 to mix with the motive fluid discharged therefrom, there being a thermostat 40 associated with the manifold 4 which controls the sliding movement of the sleeve valve 3 through the medium of the rod 41 in order to regulate the mixture of air with the motive fluid as it is discharged from the nozzle 2 into the manifold. It will be of course understood that before the plant is placed in operation the valve 3 will be in the position indicated in dotted lines, but will move to a position as indicated by full lines after the parts have become heated.

The air compressed by the compressor 32 will be forced into the jet manifold 15 through the passage 42, the upper end of said chamber constituting a valve seat 43 having associated therewith a slide valve 44, said valve having a rod 45 operable in a manner to be later explained. A booster nozzle 46 is extended into the nozzle 2, steam being conducted thereto through the pipe 47 leading from the pipe 20, said pipe having a valve 48 therein to control the flow of steam.

The casing 49 which encloses the gears 36 and 37 and the clutch structure 33 has a bracket 50 supported thereby and pivotally connected intermediate its ends thereto is a rocket arm 51, the movements being controlled by the centrifugal governor 52. This arm has its lower end connected with the valve 21 and to the outer end of the valve rod 45.

A fuel supply pipe 53 leads from the supply tank 54 to the nozzle 16' in the throat 16, said pipe being provided with a manually controlled valve 55 and an automatic valve 56, the latter being controlled by the lever 57 pivotally connected near its upper end to the bracket 50, the lower end of said bracket being pivotally connected to the valve rod 45.

A lever 58 is employed and is forced inwardly when greater speed is desired in order to increase the tension on the spring 59 of the governor 52. After the speed of the turbine reaches its limit of safe speed, the adjustable stop 60 prevents further compression of the spring 59.

The condenser 9 is mounted upon the exhaust chamber 8 and includes a collecting pan 61 having diverging side walls 62 formed with slots 63 for the passage of the exhaust fluid. A plate 64 closes the upper end of the pan 61 and supported thereby is a dome 65, the lower end of which depends into the trough 66 of the pan to provide a liquid seal. A plurality of condenser tubes 67 afford communication between the pan 61 and dome 65. It will be obvious that some water of condensation from the exhaust gases will collect in said tubes and gravitate to the shed plates 68 of the walls 62 and from thence into the pan. The main drive shaft 7 extends through a housing 69 located in the dome 65, said housing having its side walls 70 provided with slots 71 and overhanging shed plates 72, and it is through these slots that the gas is drawn from the condenser into the exhaust blower 13 through the opening 12 and subsequently exhausted through the stack 14. To aid in condensing the exhaust gases a sprayer head 73 is located in the upper end of the dome, the water therefrom being discharged downwardly to meet the incoming exhaust gases.

Gears mounted in the casing 74 are driven by the shaft 7 and operate the centrifugal pump 75, the shaft 76 thereof having a gear 77 which drives the shaft 78, said shaft serving to operate the centrifugal pump 79, the casing 80 of which having leading therefrom pipes 81 and 82, the water from the pipe 81 being conducted to the sprayer head 73, while the water from the pipe 82 is forced by the pump 75 through the pipe 83 to the economizer 84 which is mounted in the exhaust passage 8. The water of condensation is discharged from the condenser through the pipe 10 into the reservoir 11, as clearly shown in Figure 1 of the drawings. The water from the reservoir 11 is conducted to the pump 79 through the pipe 85 and is distributed through the pipes 81 and 82 as hereinbefore described.

Communicating with the generator 25 is a tubular head 86 having a valve seat 87 therein and cooperative with said seat is a valve 88 having connected thereto a thermostat 89, the inner end of which is suitably fixed to the wall of the generator. Connecting the economizer 84 and tube 86 is a pipe 90. The flow of fluid from said economizer to the tube is regulated by the valve 88. A valve controlled by-pass 86' is provided to cut out the thermostat-controlled valve 80 when desired.

To ignite the combustible mixture in the chamber 1 a hot point 91 is mounted therein, or any other suitable means of ignition may be used if desired.

A hand pump 92 may be used for supplying water to the economizer 84 in emergency, the pump having its inlet connected with the pipe 85 through a pipe 93 and its outlet connected by a pipe 94 to the pipe 83, there being a valve 95 in the pipe 83 to prevent water being pumped to the pump 75.

The operation is as follows:

The valve 55 is partially opened to permit fuel to enter the compressing throat 16 and the motor 38 is started, thus placing in operation the compressor 32 through the gears 36 and 37. The valve 55 is obviously used to subsequently control the flow of fuel to the nozzle 16'. Air from the compressor 32 is forced downwardly through the passage 42 into the jet manifold 15 where it is compressed to a higher stage by steam from the nozzles 17 and 18, and then mixes with the fuel in said throat. This mixture enters the combustion chamber 1 where it is ignited by the hot point 91. At this stage of operation the damper 26 is in the position as indicated in dotted lines in Figure 1 of the drawings, in order that the products of combustion will pass through the generator 25 for discharge through the nozzle 2 into the manifold 4 for operating the turbine 6'. When the speed of the turbine reaches that of the compressor 32 which is driven by the motor 38 the clutch structure 33 acts upon the drum 34 to interlock the same with the shaft 30, after which time the motor is cut off and the turbine continues to operate the compressor.

Since the compressor 31 is now operating it forces air into the chamber 34' to mix with and cool the products of combustion flowing from the nozzle 2. The sleeve valve 3 remains closed, as indicated in dotted lines in Figure 1 of the drawings, until the temperature in the turbine and manifold reach a predetermined degree, under which temperature the turbine can be safely operated. When the temperature rises above the determined degree the thermostat 40 will act and through the medium of the rods 41 lower or open the valve 3, thus permitting cold air from the compressor 31 to enter the mixing chamber 34' to mix with the products of combustion, thus reducing the temperature of the motive fluid and maintaining it at the predetermined degree of temperature.

The hot gases have now heated the generator 25 until the steam pressure has reached a predetermined point, whereupon the pressure regulator 28 operates to close the valve 26, as shown in full lines in Figure 1, thus maintaining a constant steam pressure in the generator 25. Steam from the generator 25 is now flowing through the pipe 24 to the superheating coil 22 and from thence to the pipe 23 to the governor valve 21. From the valve 21 the steam flows through the pipes 19 and 20 to the nozzles 17 and 18, respectively. These nozzles direct steam into the manifold 15 to compress the air directed thereinto by the compressor 32 through the valve seat 43, thus compressing the air in the manifold 15 to a higher stage in order that the combustible fuel entering the combustion chamber 1 will be under pressure determined by the pressure of the steam from the respective nozzles.

As the turbine operates the shaft 7 the gears in the casing 74 impart movement to the pump 75 to force water through the pipe 83 to the economizer 84 located in the direct path of the exhaust gases from the turbine. The water in the economizer absorbs the heat from the exhaust gases and this water then passes to the tubular head 86, the entrance of the water to the generator 25 being regulated by the valve 88. The shaft 78 operates the pump 79 to draw water from the reservoir 11 through the pipe 85, part of the water being forced through the pipe 81 to the sprayer head 73 and part through the pipe 82 to the intake of the pump 75.

The pump 92 is to be used in case the pumps 75 or 79 are not in use and at a time when it is desired to furnish water for the plant when it is initially started in operation.

When the turbine 6' has reached maximum speed the centrifugal governor 52 operates the rocker arm 51 which operates the governor valve 21 and valve 45 as well as the fuel supply controlling valve 56 to maintain constant maximum speed of the turbine. If greater speed is desired the lever 58 is manipulated to increase the tension upon the spring 59 of the governor 52. The speed may be increased in this manner until the turbine has reached the limit of safe speed, whereupon the catch 60 stops compression of the spring previously determined.

If desired to obtain more than normal power the valve 48 may be opened to permit superheated steam to pass through the pipe 47 to the booster nozzle 46. As steam is discharged from the nozzle 46 at high pressure it speeds up the discharge of motive fluid from the combustion chamber 1, thus increasing the capacity of said chamber by permitting air and fuel to enter said chamber at a maximum velocity.

Having thus described the invention, I claim:

1. In a power plant, a motor, a combustion chamber, a manifold communicating with the combustion chamber, means for conducting compressed air into the manifold, a steam generator associated with the combustion chamber, a second steam generator in the path of flow of the exhaust of gas from the motor, means for connecting the first named and second named generators to each other, a superheater connected with the first named generator, means for conducting steam from either one, or both generators to the super-heater, means for conducting steam from the super-heater to the manifold to compress the air therein to a higher stage before admission thereof to the combustion chamber, means controlling the amount of steam generated by the first generator the second generator supplying a greater amount of steam to the manifold, means for injecting fuel into the compressed air as it passes from the manifold to the combustion chamber for admission therein, and means for conducting the products of combustion from the combustion chamber to the motor.

2. In a power plant, a motor, a combustion chamber, a manifold communicating with the combustion chamber, means for conducting compressed air into the manifold, a steam generator associated with the combustion chamber, a second steam generator in the path of flow of the exhaust gas from the motor, means for connecting the first named and second named generators to each other, a superheater connected with the first named generator, means for conducting steam from either one or both generators to the superheater, means for conducting steam from the superheater to the manifold to compress the air therein to a higher stage before admission thereof to the combustion chamber, means for injecting fuel into the compressed air as it passes from the manifold to the combustion chamber for admission therein, means for injecting atmospheric air into the products of combustion in their passage from the combustion chamber to the motor, and means for conducting to the motor the products of combustion from the combustion chamber together with the atmospheric air admitted thereto.

In testimony whereof I affix my signature.

ROBERT E. LASLEY.